United States Patent
Fontenot et al.

(10) Patent No.: US 11,079,314 B1
(45) Date of Patent: Aug. 3, 2021

(54) PHOTOTHERMAL DEFLECTION SPECTROSCOPY METHOD FOR HEATING-COOLING DISCRIMINATION

(71) Applicant: The United States of America, as represented by the Secretary of the Navy, Arlington, VA (US)

(72) Inventors: Ross S. Fontenot, Montgomery Village, MD (US); Veerendra K. Mathur, Beltsville, MD (US); John H. Barkyoumb, Kensington, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 64 days.

(21) Appl. No.: 16/141,910

(22) Filed: Sep. 25, 2018

Related U.S. Application Data

(60) Provisional application No. 62/563,501, filed on Sep. 26, 2017.

(51) Int. Cl.
*G01N 21/17* (2006.01)
*G01K 17/00* (2006.01)

(52) U.S. Cl.
CPC .......... *G01N 21/171* (2013.01); *G01K 17/00* (2013.01)

(58) Field of Classification Search
CPC ...... G02B 7/028; G01N 21/171; G01N 25/00; G01N 25/02; G01N 25/16; G01N 25/18; G01N 25/20; G01K 17/00
See application file for complete search history.

(56) References Cited

U.S. PATENT DOCUMENTS

| | | | |
|---|---|---|---|
| 4,213,699 A | 7/1980 | Moore | |
| 4,243,327 A | 1/1981 | Frosch et al. | |
| 4,299,494 A * | 11/1981 | Badoz | G01N 21/171 356/432 |
| 4,468,136 A * | 8/1984 | Murphy | G01N 21/171 374/45 |
| 4,540,285 A | 9/1985 | Amer | |
| 4,708,494 A | 11/1987 | Kleinerman | |
| 4,938,593 A * | 7/1990 | Morris | G01N 27/44721 356/344 |
| 5,386,427 A | 1/1995 | Zayhowski | |
| 5,586,824 A | 12/1996 | Barkyoumb et al. | |
| 5,696,863 A | 12/1997 | Kleinerman | |
| 5,986,793 A | 11/1999 | Yamaguchi et al. | |
| 6,087,181 A | 7/2000 | Cong | |
| 6,370,172 B1 | 4/2002 | Bowman | |

(Continued)

OTHER PUBLICATIONS http://www2.pugetsound.edu/faculty/hanson/labtechniques/refractometry/theory.htm#:-:text=Since%20the%20density%20of%20a,increase%20as%20the%20temperature%20increases.&text=For%20many%20organic%20liquids%20the,%C2%B0C%20increase%20in%20temperature (Year: 2006).*

(Continued)

*Primary Examiner* — Mohamed K Amara
(74) *Attorney, Agent, or Firm* — Howard Kaiser

(57) ABSTRACT

According to exemplary practice of the present invention, a probe laser beam is aligned with a position detector and is spatially/geometrically related to a pump laser beam. A temperature gradient is produced in a medium by the pump beam. Since an increase or decrease in the temperature of the medium is related to an increase or decrease in the refractive index of the medium, position sensing of the deflection of the probe beam relative to the pump beam indicates whether the medium is heating or cooling.

13 Claims, 12 Drawing Sheets

(56) References Cited

U.S. PATENT DOCUMENTS

| | | | |
|---|---|---|---|
| 7,277,178 B2* | 10/2007 | Shpantzer | G01N 21/171 356/451 |
| 7,283,220 B2* | 10/2007 | Huang | G01N 21/4133 356/128 |
| 8,451,436 B2* | 5/2013 | Verjus | G01F 1/6884 356/213 |
| 2003/0002038 A1* | 1/2003 | Mawatari | G01N 21/171 356/300 |
| 2004/0085540 A1* | 5/2004 | Lapotko | G01N 21/171 356/432 |
| 2004/0233450 A1* | 11/2004 | Yamaguchi | G01N 21/171 356/432 |
| 2006/0181708 A1* | 8/2006 | Takahashi | G01N 21/45 356/432 |
| 2006/0214113 A1 | 9/2006 | Kleinerman | |
| 2007/0263426 A1* | 11/2007 | Hiraga | G02F 3/02 365/154 |
| 2008/0124247 A1* | 5/2008 | Matsuoka | G01N 21/645 422/82.08 |
| 2009/0027654 A1* | 1/2009 | Takahashi | G01N 21/00 356/36 |
| 2012/0026485 A1* | 2/2012 | Couston | G01N 21/45 356/125 |
| 2013/0043392 A1* | 2/2013 | Mildren | H01S 3/30 250/341.1 |
| 2015/0103855 A1* | 4/2015 | Wechsler | H01S 3/0612 372/41 |
| 2015/0211998 A1 | 7/2015 | Kuo et al. | |
| 2015/0338268 A1 | 11/2015 | Ramer et al. | |
| 2016/0109167 A1 | 4/2016 | Xiong | |
| 2016/0178506 A1* | 6/2016 | Hashizume | G01N 21/171 356/416 |
| 2018/0088041 A1* | 3/2018 | Zhang | G01J 5/22 |
| 2018/0246032 A1* | 8/2018 | Li | G01N 21/3563 |
| 2018/0323572 A1* | 11/2018 | Mildren | H01S 3/1305 |
| 2018/0372554 A1 | 12/2018 | Laycock | |
| 2019/0120753 A1 | 4/2019 | Prater et al. | |
| 2019/0162643 A1 | 5/2019 | Drinovec et al. | |
| 2020/0025677 A1* | 1/2020 | Prater | G01J 3/0289 |
| 2020/0253017 A1 | 8/2020 | Khanh et al. | |

OTHER PUBLICATIONS https://www.thesaurus.com/browse/transverse?s=t (Year: 2020).*

Salazar et al. "Novel results on collinear mirage deflection", Ana. Sci. (vol. 17, 2001, pp. 95-98) (Year: 2001).*

U.S. Appl. No. 62/563,501, filed Sep. 26, 2017, entitled "Photothermal Deflection Spectroscopy Method for Heating-Cooling Discrimination," joint inventors Ross S. Fontenot, Veerendra K. Mathur, and John H. Barkyoumb.

Ross S. Fontenot, Veerendra K. Mathur, and John H. Barkyoumb, "New Photothermal Deflection Technique to Discriminate between Heating and Cooling," Journal of Quantitative Spectroscopy and Radiative Transfer, vol. 204, Elvesier Ltd., available online Aug. 30, 2017, pp. 1-6.

Ross S. Fontenot, "Laser Cooling of CdSeZnS Quantum Dots," 34-page slide presentation, presented on Mar. 15, 2017, University of Louisiana at Lafayette (ULL).

Ross S. Fontenot, "Laser Cooling of CdSeZnS Quantum Dots," 38-page slide presentation, presented on Oct. 4, 2016, PRiME 2016 Conference of the Electrochemical Society, Honolulu, Hawaii, Oct. 2-7, 2016.

Ross S. Fontenot, Veerendra K. Mathur, John H. Barkyoumb, Carl E. Mungan, and Thanh N. Tran, "Measuring the Anti-Stokes Luminescence of CdSe/ZnS Quantum Dots for Laser Cooling Applications," Proceedings of SPIE 9821, Tri-Technology Device Refrigeration (TTDR), 982103 (May 17, 2016).

Ross S. Fontenot, John H. Barkyoumb, and Veerendra K. Mathur, "Optical Cooling of CdSe/ZnS Quantum Dots Embedded in PMMA," Oct. 4, 2017 poster session, 232nd ECS Meeting, National Harbor, MD, Oct. 1-5, 2017 (Abstract MA2017-02 2235).

Ross Fontenot, Veerendra Mathur, John Barkyoumb, Carl Mungan, and Thanh Tran, "Laser Cooling of CdSe/ZnS Quantum Dots," Oct. 4, 2016 poster session, Prime 2016 (Pacific Rim Meeting), Oct. 2-7, 2016, Honolulu, -Hawaii (Abstract J01-3131).

Stephen Potashnik, John Barkyoumb, Ross Fontenot, Danielle Braje, and Linh Pham, "Anti-stokes Luminescence of the NV-center in Diamond from a 785 nm Pump Beam," May 29, 2019 poster session, 50th Annual Meeting of the American Physical Society (APS), Division of Atomic, Molecular and Optical Physics (DAMOP), vol. 64, No. 4, May 27-31, 2019, Milwaukee, Wisconsin (Abstract I01.00138; date submitted Feb. 1, 2019).

Stephen Potashnik, John Barkyoumb, Ross Fontenot, Danielle Braje, and Linh Pham, "Anti-stokes Luminescence of the NV-center in Diamond from a 785 nm Pump Beam," May 29, 2019 poster session, 50th Annual Meeting of the American Physical Society (APS), Division of Atomic, Molecular and Optical Physics (DAMOP), vol. 64, No. 4, May 27-31, 2019, Milwaukee, Wisconsin (Poster I01.00138).

U.S. Appl. No. 62/734,886, filed Sep. 21, 2018, entitled "Automated Noncontact Method to Discriminate if Cooling is Occurring," inventors Ross S. Fontenot et al.

U.S. Appl. No. 16/578,136, filed Sep. 20, 2019, entitled "Automated Noncontact Method to Discriminate if Cooling is Occurring," inventors Ross S. Fontenot et al.

U.S. Appl. No. 62/697,866, filed Jul. 13, 2018, Fontenot et al.,. "Luminescence-Based Method for Precise Delivery of Ion Beam Therapy," inventors Ross S. Fontenot et al.

U.S. Appl. No. 16/503,095, filed Jul. 3, 2019, entitled "Luminescence-Based Method for Precise Delivery of Ion Beam Therapy," inventors Ross S. Fontenot et al.

* cited by examiner

PHOTOTHERMAL DEFLECTION SPECTROSCOPY METHOD FOR HEATING-COOLING DISCRIMINATION

CROSS-REFERENCE TO RELATED APPLICATIONS

This application claims the benefit of U.S. provisional application No. 62/563,501, filed 26 Sep. 2017, hereby incorporated herein by reference, entitled "Photothermal Deflection Spectroscopy Method for Heating-Cooling Discrimination," joint inventors Ross S. Fontenot, Veerendra K. Mathur, and John H. Barkyoumb.

BACKGROUND OF THE INVENTION

The present invention relates to cooling of materials, more particularly to laser cooling of solids and to determination of whether cooling of the solids is occurring.

Photothermal deflection spectroscopy (PDS) is a spectroscopy method that measures the change in the index of refraction caused by temperature gradients. While there has been significant research using PDS to determine how much heat is absorbed in thin films, there has been little research performed on whether this technique can be unambiguously used for cooling. Because PDS is a non-contact and non-destructive technique, it has been increasingly investigated for use in laser cooling applications.

The following references, each of which is hereby incorporated herein by reference, are pertinent to laser cooling: Ross S. Fontenot, R. S., Veerendra K. Mathur, John H. Barkyoumb, Carl E. Mungan, and Thanh N. Tran, "Measuring the Anti-Stokes Luminescence of CdSe/ZnS Quantum Dots for Laser Cooling Applications," *Proceedings of SPIE* 9821, Tri-Technology Device Refrigeration (TTDR), 982103 (17 May 2016); J. H. Barkyoumb and D. J. Land, "Thermal Diffusivity Measurement of Thin Wires Using Photothermal Detection," *J. Appl. Phys.* 78, 905 (1995); Method of Measuring the Thermal Conductivity of Microscopic Graphite Fibers, J. H. Barkyoumb, L. T. Kabacoff, and D. J. Land, U.S. Pat. No. 5,586,824, issued December 1996); Epstein, R. and Sheik-Bahae, M., [Optical Refrigeration: Science and Applications of Laser Cooling of Solids], Wiley-VCH, Weinheim, Germany, Chapter 1 Optical Refrigeration in Solids: Fundamentals and Overview, 1-32 (2009); Nemova, G. and Kashyap, R., "Laser Cooling of Solids," *Reports on the Progress of Physics*, 73, 086501 (2010); Sheik-Bahae, M. and Epstein, R. I., "Optical Refrigeration," *Nature Photonics*, 1, 693-699 (2007); Edwards, B. C., Buchwald, M. I., and Epstein, R. I., "Development of the Los Alamos Solid-State Optical Refrigerator," *Review of Scientific Instruments*, 69(5), 2050-2055 (1998); Zhang, J., Li, D., Chen, R., and Xiong, Q., "Laser Cooling of a Semiconductor by 40 Kelvin," *Nature*, 43, 504-508 (2013); Jackson, W. B., Amer, N. M., Boccara, A. C., and Fournier, D., "Photothermal Deflection Spectroscopy and Detection," *Applied Optics*, 20(8), 1333-44 (1981); Loriette, V., and Boccara, C., "Absorption of Low-Loss Optical Materials Measured at 1064 nm by a Position-Modulated Collinear Photothermal Detection Technique," *Applied Optics*, 42(4), 649-656 (2003); Mungan C. E., Buchwald M. I., Edwards B. C., Epstein, R. I. and Gosnell T. R., "Internal Laser Cooling of $Yb^{3+}$-Doped Glass Measured between 100 and 300 K," *Appl. Phys. Lett.* 71(11), 1458-1460 (1997); S. R. Bowman, U.S. Pat. No. 6,370,172, "Non-Exothermic Quasi-Two Level Laser," issued 9 Apr. 2002.

SUMMARY OF THE INVENTION

In view of the foregoing, it is an object of the present invention to provide an improved methodology for determining whether a solid sample is cooling in association with administration of laser energy.

The following six-page paper, hereby incorporated herein by reference, is co-authored by the present inventors and discloses some embodiments of the present invention: Ross S. Fontenot, Veerendra K. Mathur, and John H. Barkyoumb, "New Photothermal Deflection Technique to Discriminate between Heating and Cooling," *Journal of Quantitative Spectroscopy and Radiative Transfer*, Volume 204, Elvesier Ltd., available online 30 Aug. 2017, pages 1-6. This paper by Fontenot et al. is included in the aforesaid U.S. provisional application No. 62/563,501, filed 26 Sep. 2017.

PDS is a powerful technique that has a wide range of applications, especially in the thermal sciences. Most applications have been devoted to studying heating effects. Researchers looking at optical refrigeration or laser cooling of solids have recently begun to consider use of PDS to determine cooling. Laser cooling of solids uses anti-Stokes emission to annihilate phonons from materials, which in turn cools materials. It can be used to achieve an all-solid-state cryocooler that is compact, contains no moving parts, has a high reliability, and does not require the use of cryogenic fluids.

Current PDS methodology for laser cooling of solids requires multiple pump laser wavelengths, i.e., wavelengths far in the Stokes region to guarantee heating as well as wavelengths in the anti-Stokes regions beyond the mean effective wavelength for possible cooling. The phase change produced by the cooling and heating beams is recorded on an oscilloscope to show cooling, i.e., the Stokes or heating beam is deflected one way, while the anti-Stokes or cooling beam is deflected in the opposite direction.

Conventional application of photothermal methods to laser cooling typically commences by aligning a probe beam (typically a stabilized low power HeNe laser) directly in the center of a position detector. A pump beam is then aligned so it is collinear or transverse, depending upon the setup and type of PDS being performed. The pump beam wavelength is chosen depending upon the desired effect. For example, if someone wants to show cooling, he/she chooses a wavelength in the anti-Stokes region. If someone wants to show heating, he/she chooses a wavelength in the Stokes region. Once the wavelength is chosen, the sample being investigated is placed in the path of these two beams. The pump laser is then pulsed or modulated at a certain frequency. The deflection of the probe beam caused by this pulse is recorded using a lock-in amplifier.

According to conventional methodology, to prove cooling is occurring, researchers typically use multiple lasers. One laser is far into the Stokes region such that it guarantees heating, while other lasers are chosen such that they are in the anti-Stokes region to produce cooling. An oscilloscope is used to record a snapshot of a pulse from each laser. Then, the researcher shows that cooling laser produces a signal that is either increasing or decreasing, while the heating laser provides a 180° phase reversal. If cooling were not occurring in the anti-Stokes region, then there would be no phase reversal, since the only change in conditions is the laser wavelength.

However, the present inventors found that phase reversal is not in and of itself a unique signature of cooling. The present inventors obtained a phase reversal by interchanging the position of the pump and probe beam. The present inventors thus decided that a more reliable method is required to indicate cooling or heating.

The methodology of the present invention provides, inter alia, unique criteria to differentiate between heating and cooling. In contrast to current PDS methodology, the present invention's new photothermal deflection methodology does not require the use of multiple wavelengths to determine cooling. Instead, according to exemplary inventive practice, the deflection of the probe beam with respect to the pump beam is required to determine if heating or cooling is occurring inside a sample. Exemplary practice of the present invention provides a simpler and more reliable photothermal deflection spectroscopy method for determining whether cooling or heating is occurring in a medium.

According to exemplary embodiments of the present invention, the probe beam is being deflected towards the left when the pump beam is to the left of center. Likewise, the probe beam is deflected towards the right when the pump beam is on the right. In other words, the probe beam is always deflecting towards the pump beam. That is, this deflection will occur when the probe beam is passing from hotter to a cooler medium. Conversely, if the pump beam was heating, the probe beam would be deflected away from the pump beam. Therefore, according to exemplary inventive practice, simply knowing which way the probe beam is deflecting is the only requirement for determining cooling or heating. Notably, the inventive method may be used to determine if cooling or heating is occurring for signals that are too weak to be observed on an oscilloscope.

Exemplary inventive practice provides a method for determining whether heating or cooling of a medium is associated with impingement thereupon by laser energy. The inventive method includes: configuring a probe laser beam and a pump laser beam; causing a sample to absorb photons of the pump laser beam, the pump laser beam thereby producing a temperature gradient; and determining a deflection of the probe laser beam with respect to the pump laser beam. If the temperature gradient is a heating gradient, then the refractive index of the sample decreases. If the temperature gradient is a cooling gradient, then the refractive index of the sample increases. The deflection of the probe laser beam with respect to the pump laser beam is indicative of whether the temperature gradient is a heating gradient or a cooling gradient.

According to an inventive embodiment that was conducted by the present inventors, a Spectra Physics Model 117A HeNe laser probe beam was aligned such that the probe beam passed through a CdSe/ZnS colloid and was in the center of a position sensitive detector 300. The 647-nm OBIS pump beam was co-aligned so that it was 130 μm to the right of the probe beam as it passed through the colloid sample. The pump beam was aligned by moving a right angle prism with a Newport 850A linear actuator. Lenses with long focal lengths were used to focus the beams at the edge of the quartz cell containing the CdSe/ZnS colloid. Angular deflections of the HeNe probe beam, which were caused by thermally-induced refractive index gradients in the colloid, were measured using a position sensitive detector. An Ortec 448 research pulser and Wavetek 184 wave generator were used to pulse or modulate, respectively, the pump laser 200. The signal from the position sensitive detector 300 was amplified using a Stanford Research Systems SRS530 lock-in amplifier.

BRIEF DESCRIPTION OF THE DRAWINGS

FIG. 7 shows the probe beam deflections when the probe beam is to the left and right, respectively, of the pump beam.

As shown in FIG. 8, the x-axis is reversed to match the face of the detector.

As shown in FIG. 12, p, n, and T represent the density, index of refraction, and temperature, respectively for (1) outside and (2) inside the hot/cold front.

DESCRIPTION OF EXEMPLARY
EMBODIMENTS OF THE INVENTION

In accordance with exemplary practice of the present invention, in order to prove that cooling or heating is occurring, an initial step is to map the position sensitive detector (PSD). In one inventive embodiment this was accomplished by the present inventors by scanning an HeNe beam across a position sensitive detector and determining the phase and x-amplitude at each point. The results of this are shown in FIG. 1, which illustrates phase mapping of the position sensitive detector.

Figure 1:
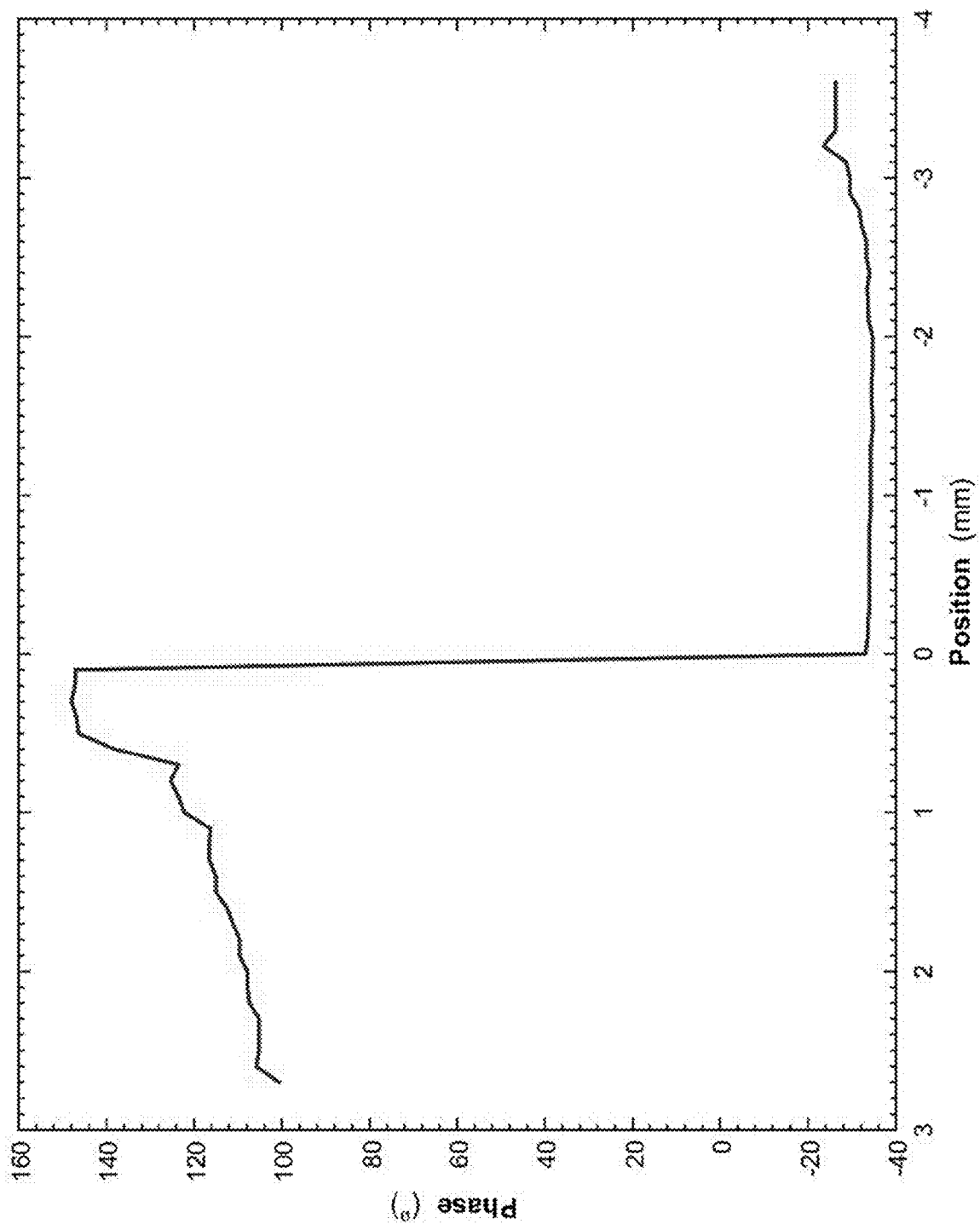
FIG. 1 is a graph illustrating an example of phase mapping of a position sensitive detector.

In the FIG. 1 graph, the x-axis is plotted in reverse to match the position of the position sensitive detector. Note that when an observer is to the left of center, the phase is between about 100° and 160°. However, if the observer is to the right of the position sensitive detector, then the phase is between −20° and −40°. There is about a 180° phase change as you cross the center of the detector. After this is done, some typical PDS procedures may be followed.

Figure 2:
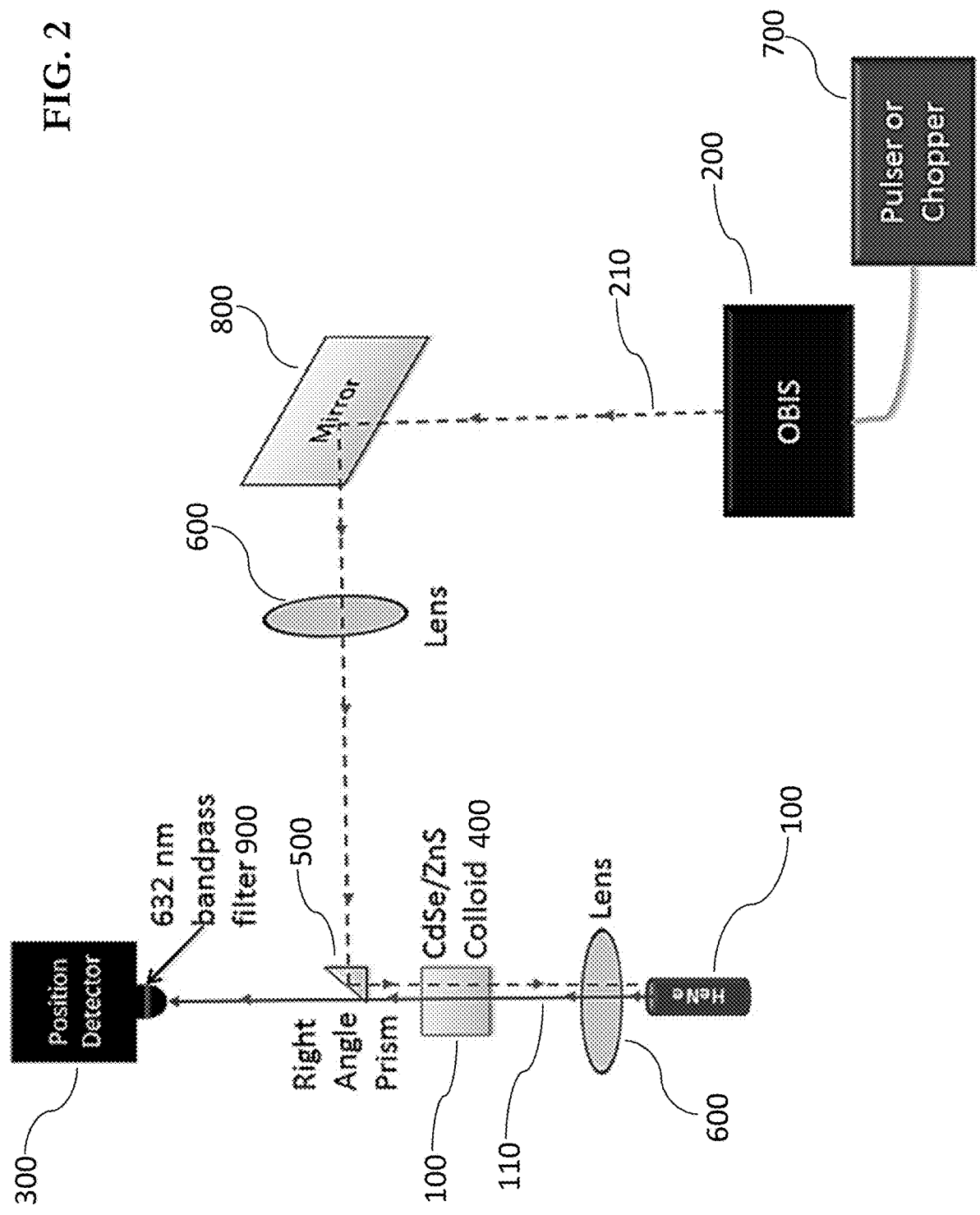
FIG. 2 is a diagram depicting an embodiment of photothermal deflection apparatus in accordance with the present invention.
Figure 3:
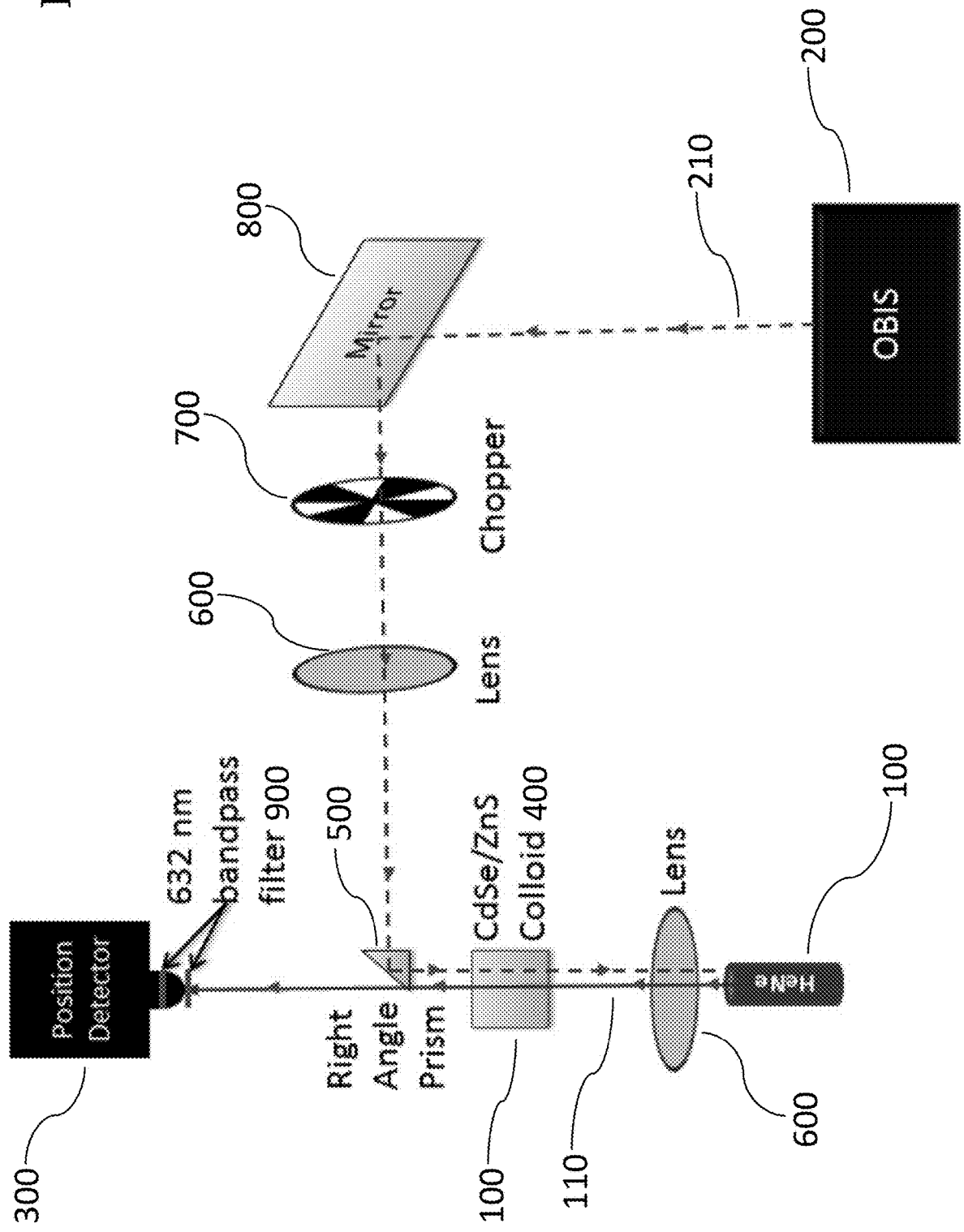
FIG. 3 is a diagram, similar to FIG. 2, depicting another embodiment of photothermal deflection apparatus in accordance with the present invention.

FIGS. 2 and 3 are similar diagrams, each illustrating an example of a photothermal deflection spectroscopy (PDS) setup in accordance with the present invention. For each of the inventive embodiments shown respectively in FIGS. 2 and 3, collinear pump and probe beams are used. Nevertheless, according to usual inventive practice, either PDS configurative technique (i.e., either a collinear approach or a transverse approach) may suffice.

CdSe/ZnS QDs (QSP-630) were purchased from Ocean NanoTech. According to the manufacturer, these QDs have an emission spectrum centered at 630 nm, and an external quantum efficiency of 80%. A 3 mL solution containing 5 mg/mL of CdSe/ZnS to toluene (Fisher T324 ACS grade) was mixed inside a UV fused quartz cuvette with an airtight stopper (Thorlabs CV10Q3500FS). Coherent OBIS LX lasers were used for the anti-Stokes wavelengths, while a Thorlabs L5209120 laser diode was used for the Stokes wavelength.

Photothermal deflection was employed by the present inventors to measure the local temperature gradients induced by the pump laser 100 inside the colloid 400. Referring to the similar photothermal deflection setups shown in FIGS. 2 and 3, respectively, a probe laser 100 was used to transmit a probe laser beam 110, and a pump laser 200 was used to transmit a pump laser beam 210. A mode stabilized Spectra Physics Model 117A HeNe laser 100 probe beam 110 was aligned such that the probe beam 110 passed through the CdSe/ZnS colloid sample 400 and was in the center of a position sensitive detector 300. According to some inventive embodiments a bandpass filter 900 is used in association with position detector 300.

The OBIS (637, 6 40, 6 47, and 660 nm) or Thorlabs (520 nm) laser 200 pump beam 210 was co-aligned 100 µm to the right of the probe beam 110. Pump beam 210 passed through sample 400 in a counter-propagating position to minimize crosstalk with probe beam 110 in position detector 300. Each laser was set to its max power: 140, 100, 120, 100, 40, or 120 mW for the OBIS 637, 6 40, 6 47, 660, 685 nm or Thorlabs 520 nm lasers, respectively. The pump beam 210 was aligned by moving a right angle prism 500 with a Newport 850A linear actuator.

Lenses 600 with long focal lengths were used to focus the beams at the edge of the quartz cuvette containing the CdSe/ZnS colloid. According to some inventive embodiments a mirror 800 is used to reflect pump beam 210 prior to reaching lens 600 and/or chopper 700. Angular deflections of the HeNe probe beam 110, which were caused by thermally-induced refractive index gradients in the colloid 400, were measured using a position sensitive detector 300 and recorded using an oscilloscope or Stanford Research SR530 dual phase lock-in amplifier. Optical chopper 700 was set to 18.3 Hz to modulate the pump beam 210.

Figure 4:
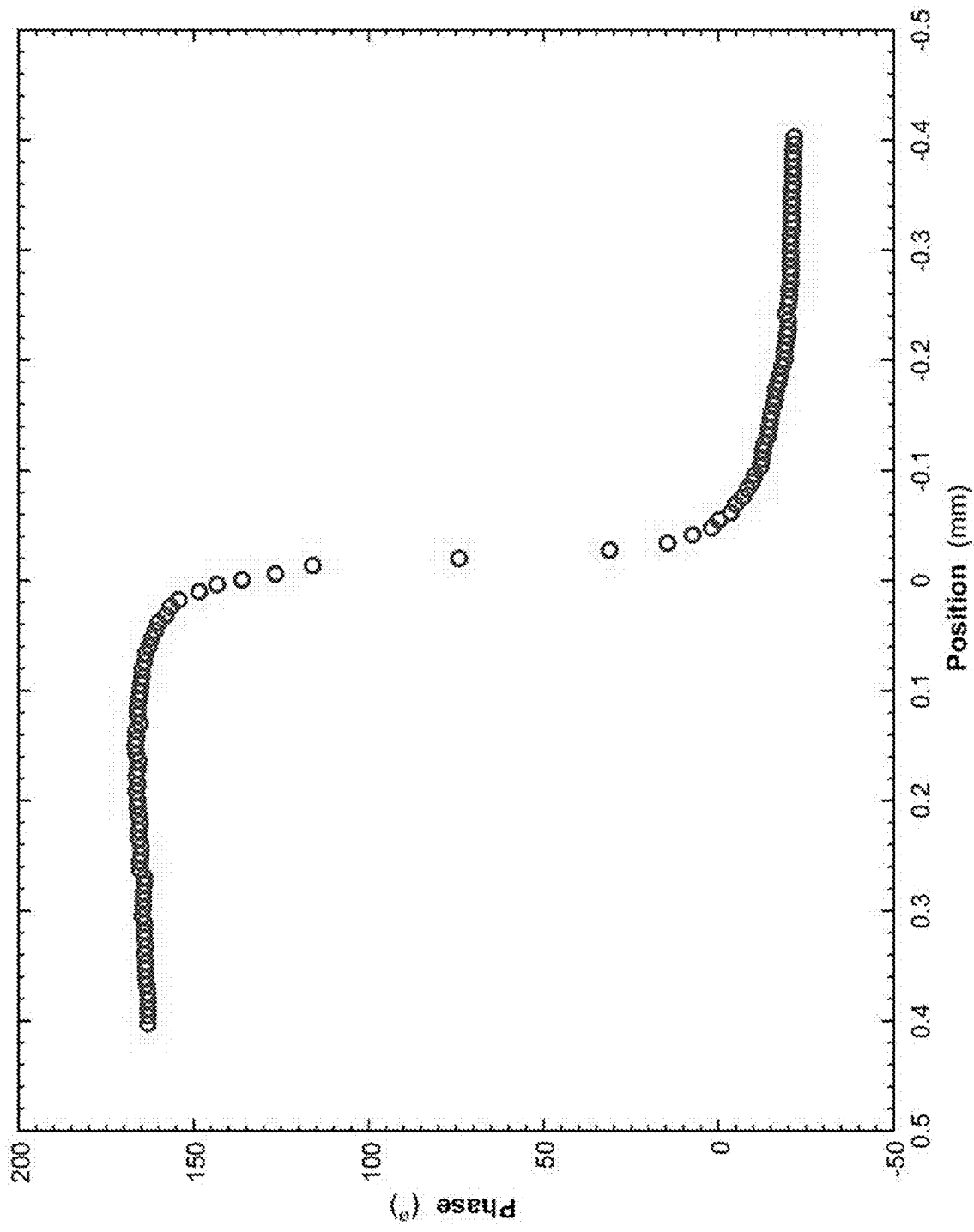
FIG. 4 is a graph illustrating an example of photothermal deflection spectroscopy measurement results in accordance with the present invention.

FIG. 4 is a graph illustrating the results of an example of PDS measurement in accordance with the present invention. In this example of inventive PDS measurement, the results show the effect of pump laser distance on the phase deflection of the probe laser. As one can see, as the pump laser (heating or cooling laser) is moved away from the probe beam, the phase shift is relatively constant.

Figure 5:
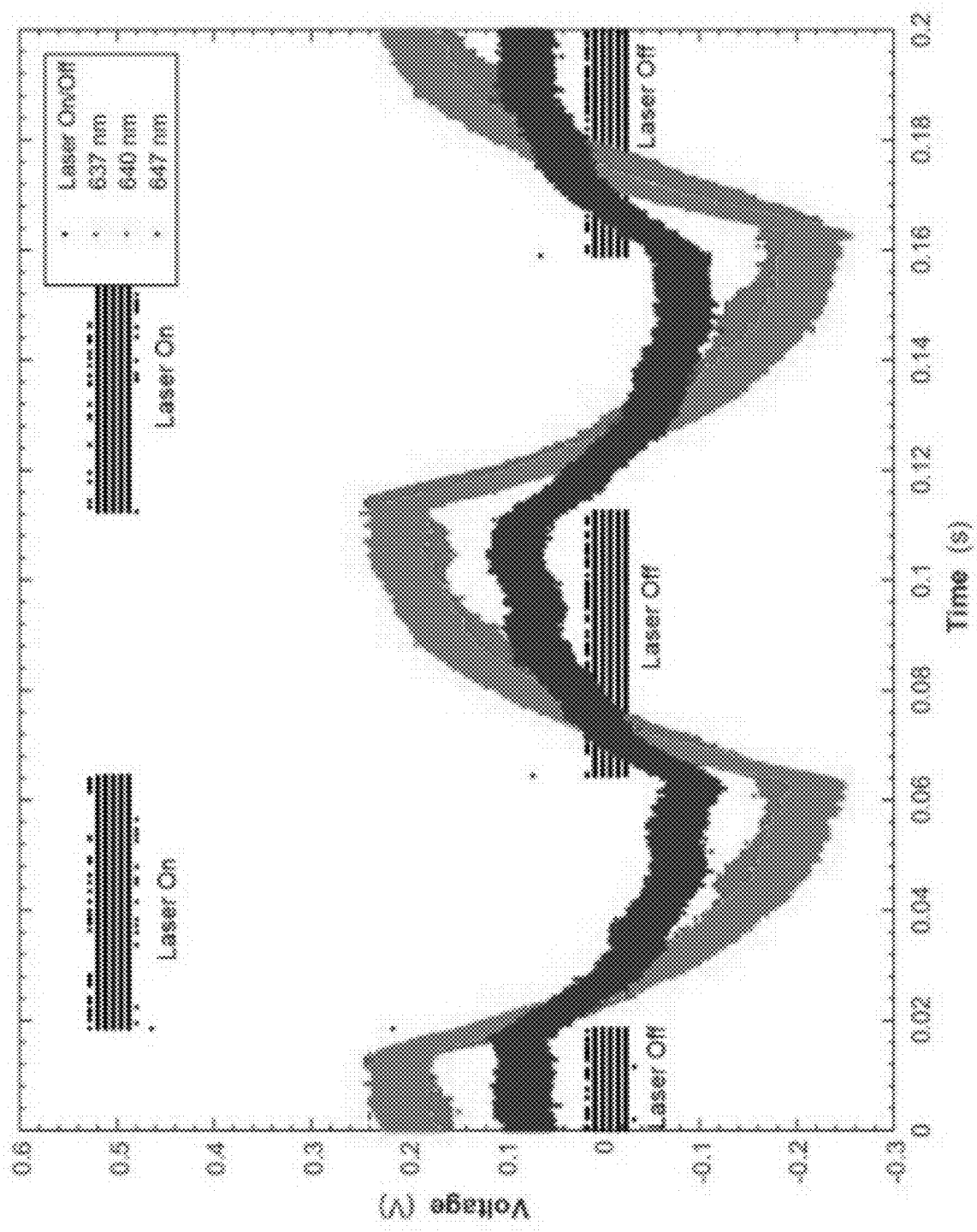
FIG. 5 and FIG. 6 are graphs illustrating respective examples of photothermal deflection spectroscopy measurement results in accordance with the present invention. The results shown in FIG. 5 are for the 637 (red), 640 (cyan), and 647 (blue) nm OBIS lasers. The results shown in FIG. 6 are for the 520 nm Thorlabs laser with the on-time shown in black. All lasers were set to their max power for these measurements.
Figure 6:
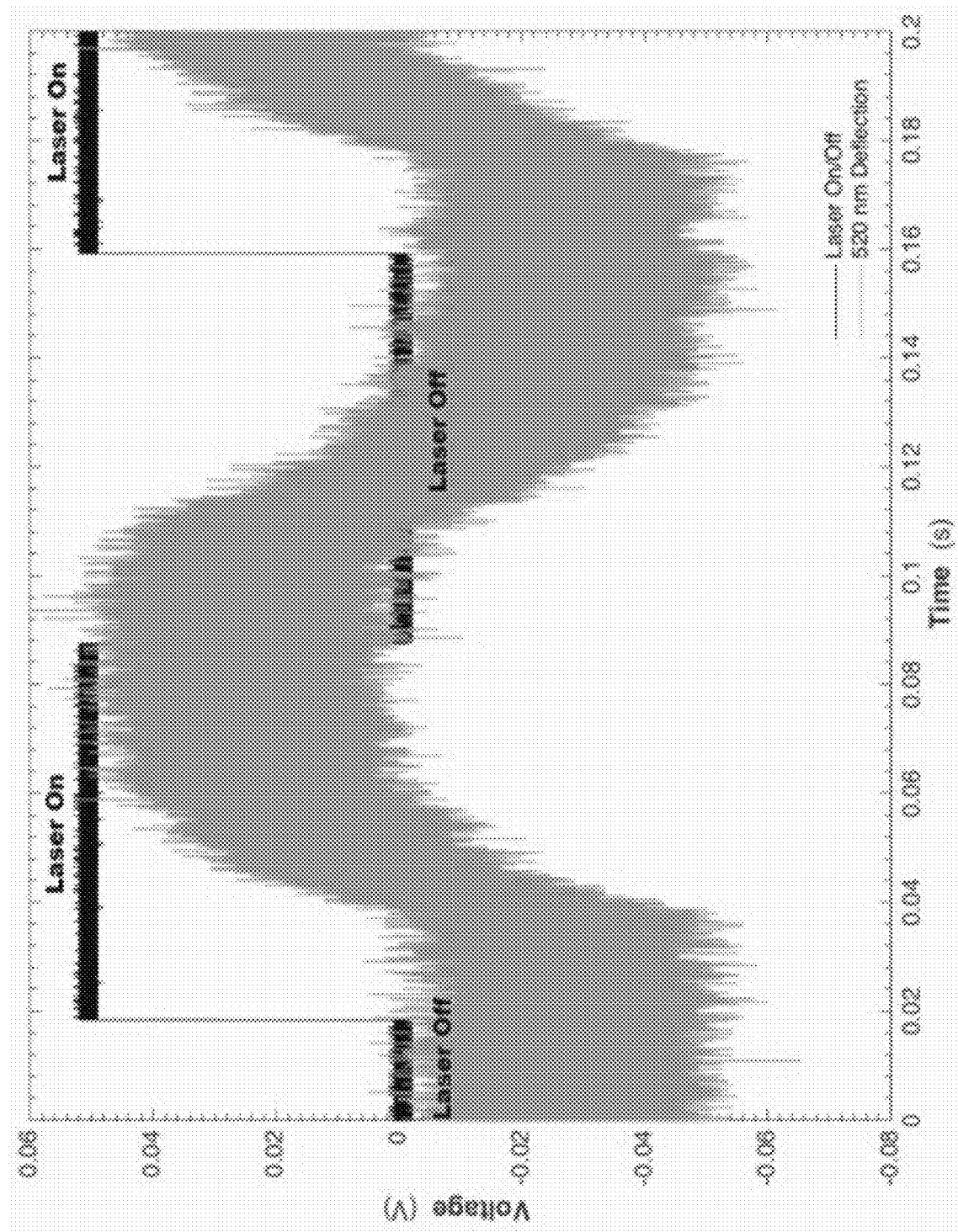

Photothermal results for the anti-Stokes wavelengths, i.e., 637, 640, and 647 nm, are shown in FIG. 5. Here, the black square wave signal shows when the laser is "on" and "off". It should be noted that the 660 nm laser produced a very weak signal, while the 685 nm laser produced no detectable signal. As such, neither of these results is shown. FIG. 6 shows the photothermal deflection spectroscopy results for the 520 nm Stokes wavelength.

Figure 7:
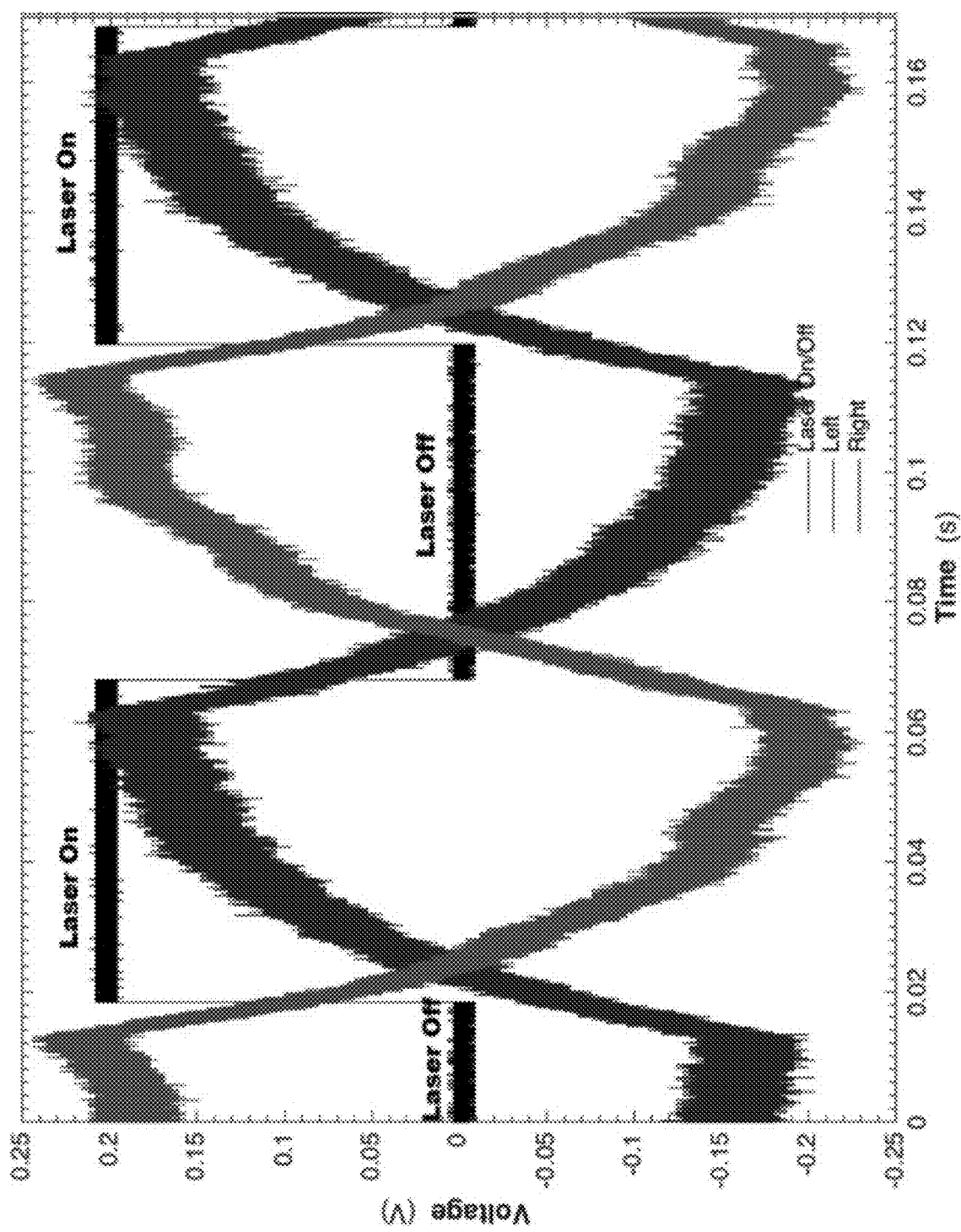
FIG. 7 is a graph illustrating an example of photothermal deflection spectroscopy measurement results, in accordance with the present invention, for the 637 nm pump laser.

If the results are compared in FIGS. 5 and 6, one can see an unmistakable 180° phase difference between the anti-Stokes and Stokes waveforms. This indicates that the positive temperature gradient (heating) produced by the Stokes laser becomes a negative temperature gradient (cool-ing) for the anti-Stokes wavelengths. While performing the PDS experiment, the present inventors found that phase reversal is not in and of itself a unique signature of cooling. They could obtain a phase reversal by interchanging the position of the pump and probe beam, as shown in FIG. 7. Thus, a more reliable method is required to indicate cooling or heating.

To prove if cooling or heating is occurring at the microscopic level, the position sensitive detector must be mapped to determine the position of the probe beam. This was done by the present inventors by first positioning the probe beam in the center of the position detector, which was determined by measuring zero voltage in both the horizontal and vertical channel. Then, a linear actuator was used to scan the HeNe probe beam in 10 µm increments. A lock in amplifier was used to determine the phase and amplitude at each of these points.

The laser was pulsed using an optical chopper set to 18.3 Hz. It should be noted that the linear actuator was accurate to about 1 µm. Since the distance from the sample to the detector was 30 cm, the minimum observable deflection would be approximately 300 µrad or 0.017°. Using the basic laws of refraction, this would indicate a temperature sensitivity of approximately 25 µK.

Figure 8:
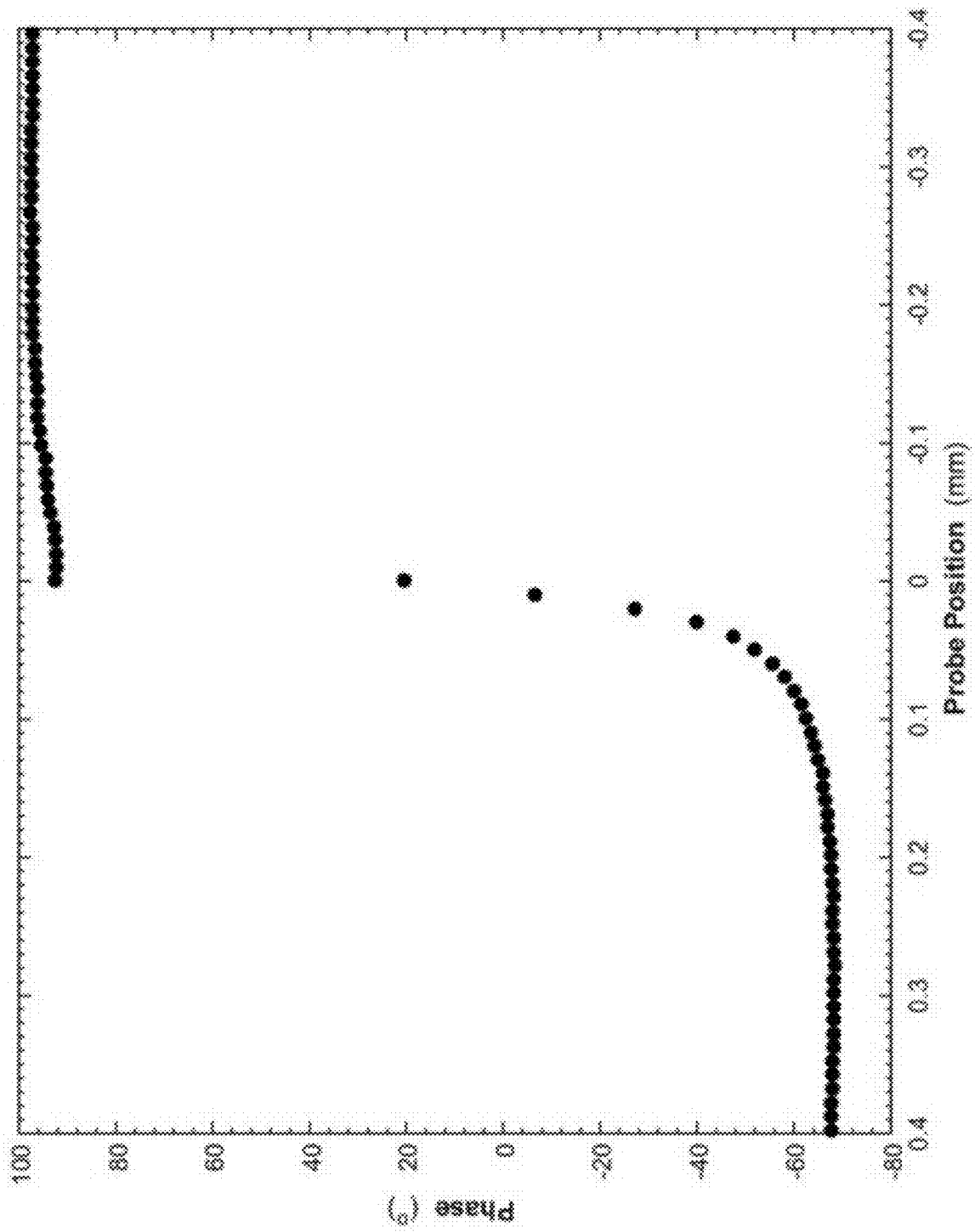
FIG. 8 is a graph illustrating an example of photothermal deflection spectroscopy phase results, in accordance with the present invention, for the position sensitive detector.

FIG. 8 shows the measured phase of the position sensitive detector. Notice that when the probe beam is to the right of center, the phase of the detector is about 100°. However, if it is to the left of the detector, then the phase is about −65°. There is about a 180° phase change as the probe beam crosses the center of the detector. After the detector is mapped, some typical PDS procedures remain the same.

Figure 9:
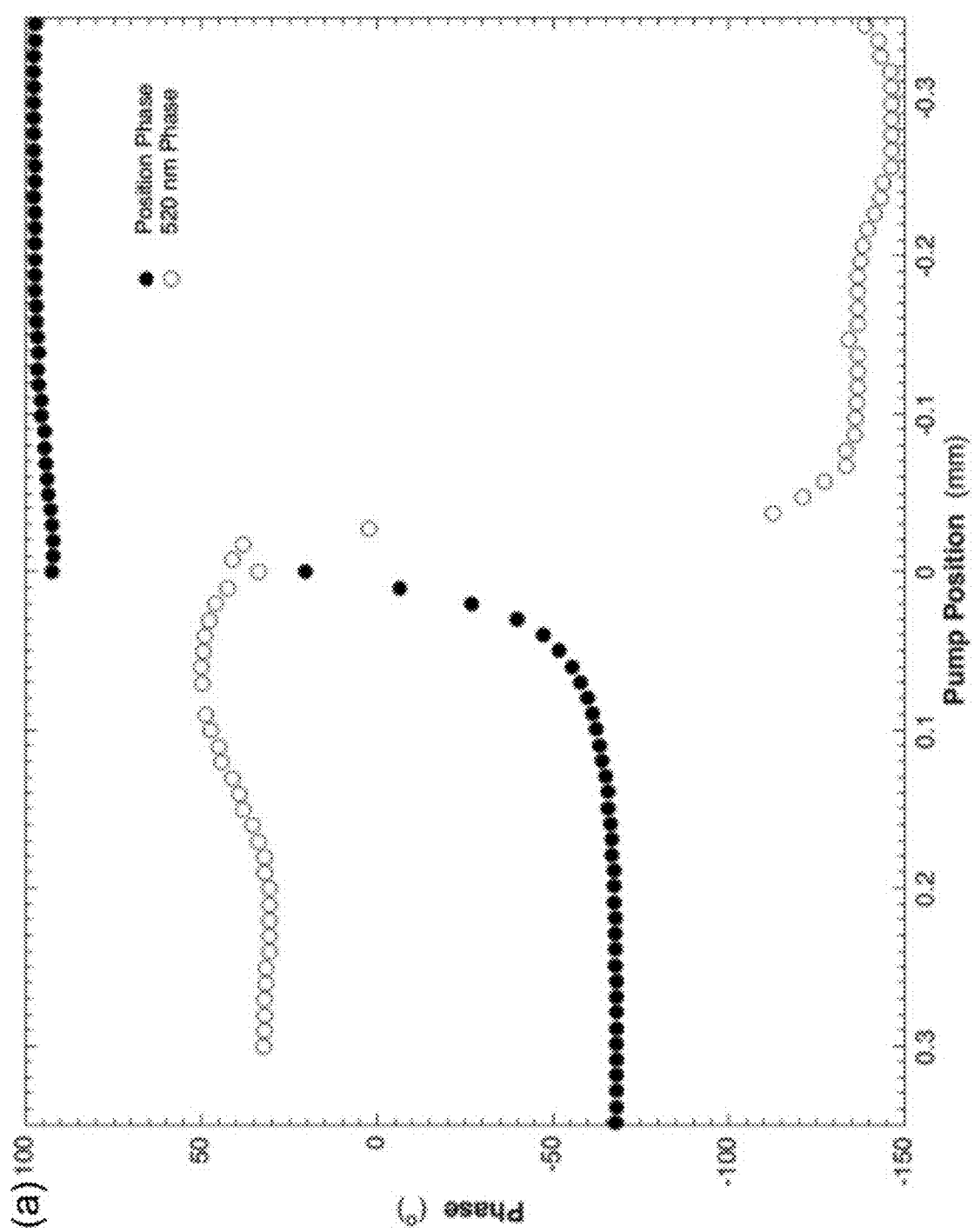
FIG. 9 and FIG. 10 are graphs illustrating respective examples of photothermal deflection spectroscopy measurement results, in accordance with the present invention, for the Stokes (FIG. 9) and anti-Stokes (FIG. 10) wavelengths.
Figure 10:
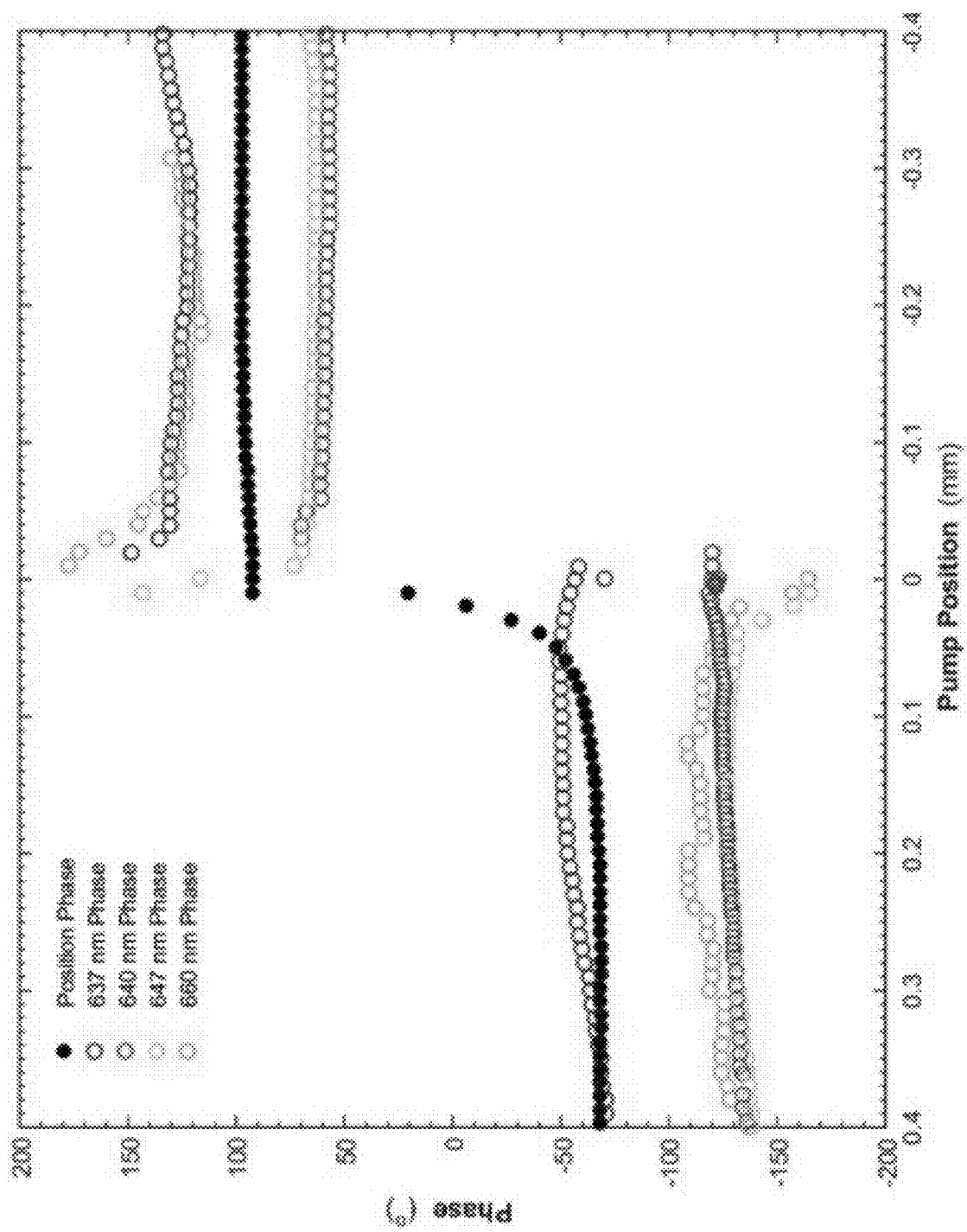

FIG. 9 illustrates PDS for the Stokes wavelengths. FIG. 10 illustrates PDS for the anti-Stokes wavelengths. As shown in FIGS. 9 and 10, the solid black circles represent the phase of the position sensitive detector as one moves away from center. The open colored circles represent the deflection phase of the probe beam caused by the modulated thermal gradient being produced by the Stokes (FIG. 9) or anti-Stokes (FIG. 10) photons.

FIG. 9 shows that when the Stokes pump beam is 0.2 mm to the right of center, the probe beam phase is negative. Comparing this result to the position detector phase without the pump beam present, one can see that this indicates that the probe beam is deflected to the left of (away from) the probe beam. FIG. 10 shows the complete opposite results. When the anti-Stokes pump beam is 0.2 mm to the right of center, the phase is positive. Comparing this result to the position detector phase without the pump beam being present, one can see that the deflection of the probe beam is toward the right, i.e., toward the pump beam. The x-axis is reversed in FIGS. 9 and 10 to match the face of the detector.

FIG. 9 shows the phase of the PDS signal for the (a) 520 nm Stokes and (b) 637-660 nm anti-Stokes wavelengths. When the Stokes pump beam is moved 0.1 mm to the left of the probe beam (FIG. 9), the probe beam phase is approximately 50°. Likewise, when the Stokes pump beam is moved 0.1 mm to the right of the probe beam, the probe phase is approximately −140°. If these results are compared to the mapped detector phase, one can see that the probe beam deflects to the right when the pump beam is on the left as indicated by the positive phase. Likewise, the probe beam deflects toward the left when the pump beam is to the right as indicated by the negative phase. In other words, the probe beam is being deflected away from the pump beam.

FIG. 10 shows that the phase of the probe beam deflection is reversed with the anti-Stokes wavelength pump beam. When the anti-Stokes pump beam is moved 0.1 mm to the left of the probe beam, the probe phase is negative. If these results are compared to the detector phase, one can see that the probe beam is deflecting to the left. Similarly, the probe beam deflects toward the right when the pump beam is to the right of center as indicated by the positive phase.

Figure 11:
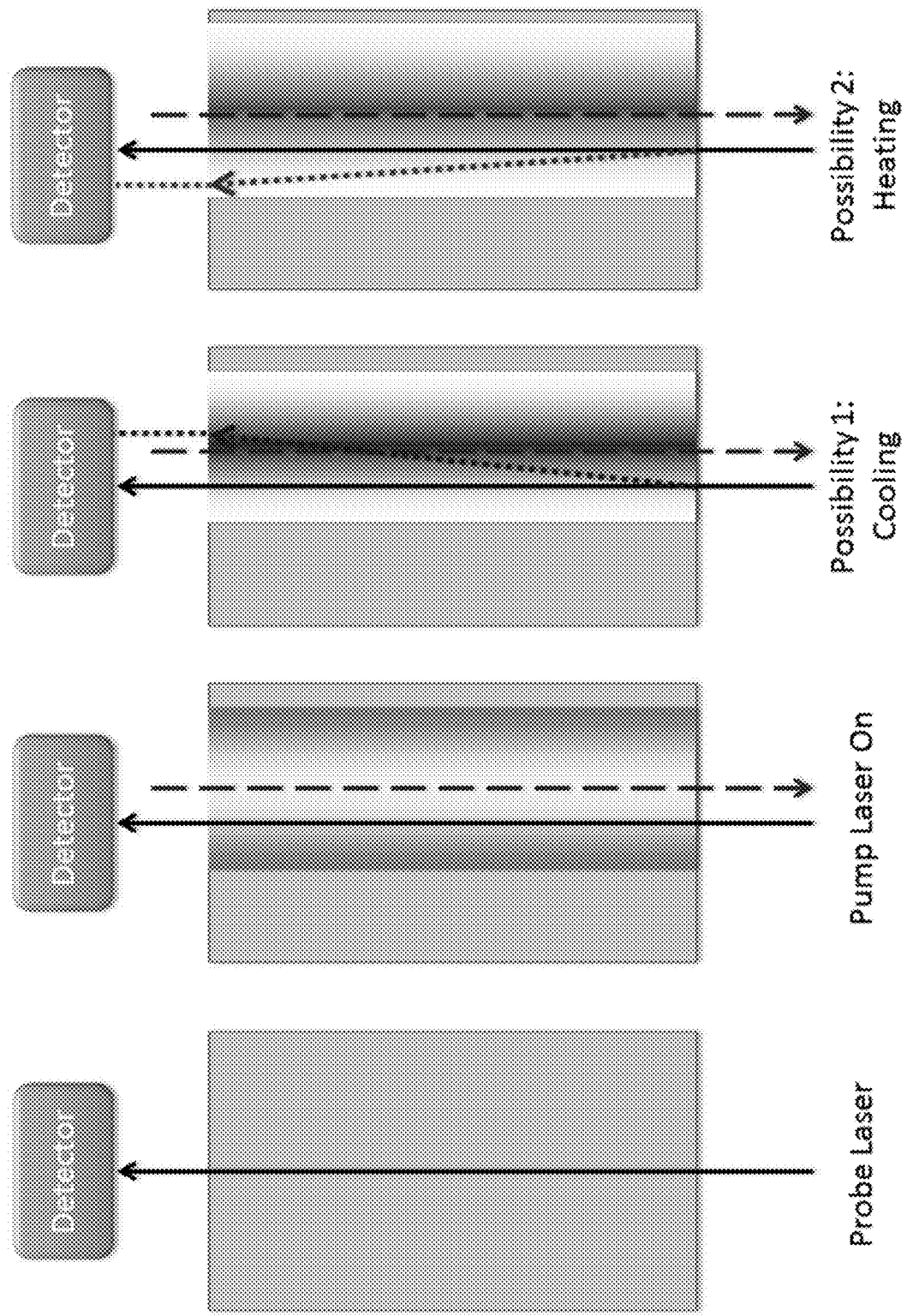
FIG. 11 is a diagram showing the possible PDS scenarios for an electromagnetic beam interacting with a medium. First, the probe beam is aligned so that it passes through the material and aligns in the center of the position sensitive detector. When the pump laser is turned on, it produces a temperature gradient owing to the absorption of the electromagnetic radiation. This absorption can either lead to a cooling or heating of the medium, which will cause the probe laser to deflect toward or away from the normal, respectively.

FIG. 11 is a diagram showing possible deflections caused by the pump laser beam. The leftmost portion shows that without any pump beam, the probe laser will be directly in the center of the detector. However, when one turns on the pump beam (second drawing from left), this will create a gradient that deflects the probe beam. If the beam is cooling ("Possibility 1"), the probe beam is deflected towards the pump beam. If the beam is heating ("Possibility 2"), the probe beam is deflected away from the pump beam.

Figure 12:
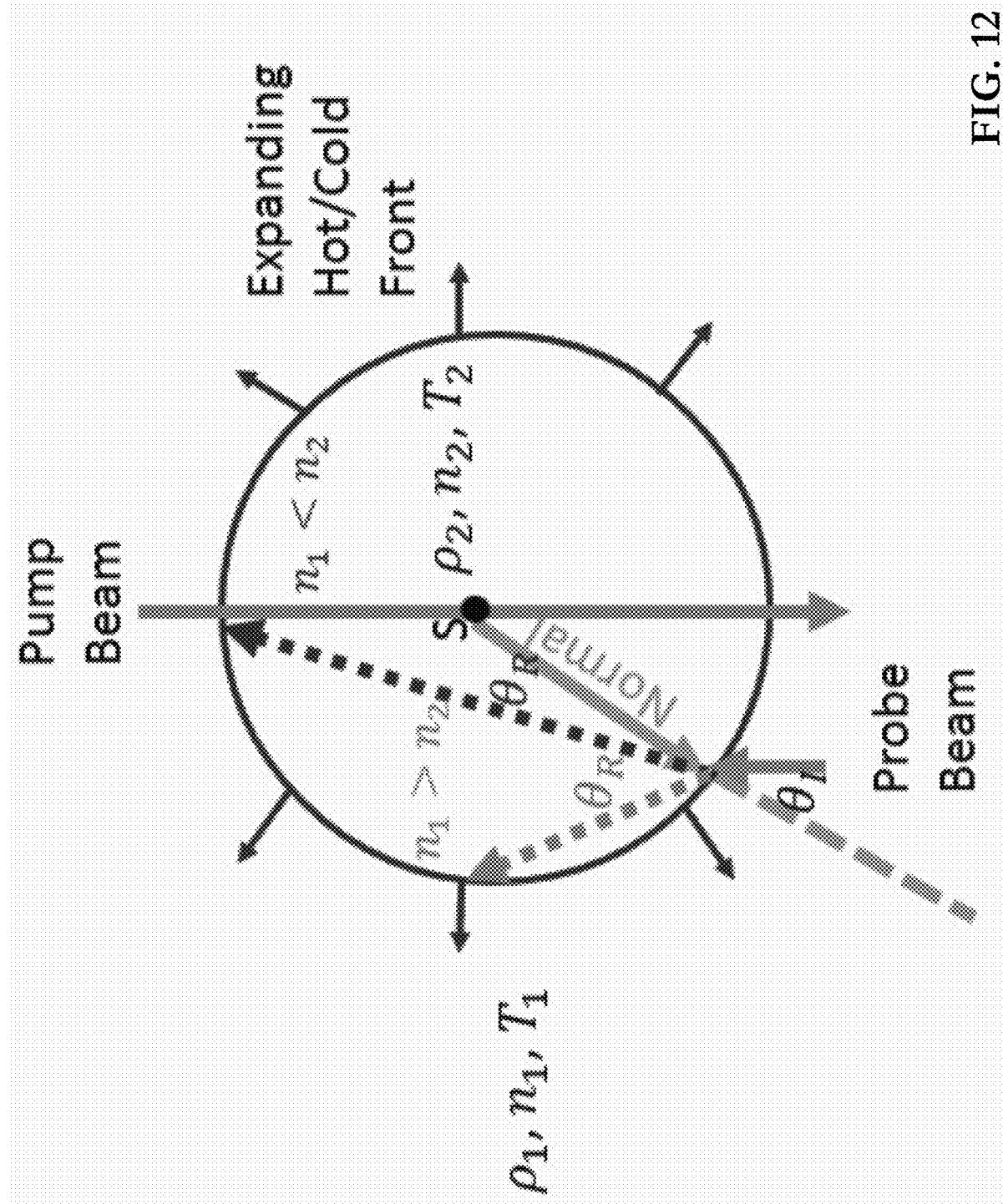
FIG. 12 is a diagram showing the expanding heat/cold front produced by the pump beam.

The physical phenomenon underlying these deflections can be explained using the model shown in FIG. 12, which provides an exploded view of the interaction between the probe beam and radially expanding heat/cold front. Assume that S is a point source of heat/cold created by the absorption of pump beam by the colloid. The resulting T wave moves radially outward and interacts with the probe beam. The temperature inside this front, i.e., inside the circle of FIG. 12, is at a different temperature than outside the front. This temperature difference results in a change in the index of refraction.

Still referring to FIG. 12, if one draws a line that passes through the point source to the point of intersection with the front, this line will be normal to the surface of expanding heat/cold front. For simplicity, we assume that the front expands spherically in all directions. Due to the change in refractive index, the probe beam will deviate as it crosses this front. If the probe beam goes from a lower refractive index to a higher refractive index, the probe beam will deflect toward the normal, i.e., toward the pump beam (source of heating or cooling), according to the laws of refraction. Similarly, if the probe beam goes from a higher index of refraction to a lower one, it will deflect away from the normal.

The above-described deflections of the probe beam are governed by laws of refraction as indicated by the following equation: $n_1 \sin \theta_i = n_2 \sin \theta_r$. According to this equation, $\theta_i$, $\theta_r$, $n_1$, and $n_2$ are the angle of incidence, angle of refraction, index of refraction for 1 (outside), and index of refraction for 2 (inside) the heat/cold front, respectively. Table 1, below, sets forth the three cases that are possible from this equation. In case number one: $n_2 > n_1$ $T_2 < T_1$ $\theta_r < \theta_i$. The probe beam deflects toward the pump beam; i.e., the pump beam is cooling. In case number two: $n_2 < n_1$ $T_2 > T_1$ $\theta_r > \theta_i$. The probe beam deflects away from the pump beam; i.e., the pump beam is heating. In case number three: $n_2 = n_1$ $T_2 = T_1$ $\theta_r = \theta_i$. No deflection occurs.

TABLE 1

| Case | $n_2$ | T | θ | Result |
|---|---|---|---|---|
| Number One | $n_2 > n_1$ | $T_2 < T_1$ | $\theta_r < \theta_i$ | The probe beam deflects toward the pump beam; i.e., the pump beam is cooling. |
| Number Two | $n_2 < n_1$ | $T_2 > T_1$ | $\theta_r > \theta_i$ | The probe beam deflects away from the pump beam; i.e., the pump beam is heating. |
| Number Three | $n_2 = n_1$ | $T_2 = T_1$ | $\theta_r = \theta_i$ | No deflection occurs. |

Thus, by monitoring the deviation of the probe beam with reference to the pump beam, one can determine whether the pump beam is cooling or heating. FIGS. 9 and 10 show, byway of example, results in accordance with inventive practice. According to this experiment conducted by the present inventors, the probe beam is first aligned so that it passes through the medium, and is aligned such that it is in the center of the position sensitive detector, such as shown in FIG. 11. Once the pump beam is turned on, the medium will absorb some or all of the photons, which will create a temperature gradient that expands radially.

For the Stokes case, i.e., heating beam, when the 520 nm pump beam interacts with the QD colloid, it produces a heat gradient inside the material that causes the material to become less dense. This lowers the index of refraction and causes the probe beam to move away from the normal, which in this case would be away from the pump beam.

Similarly, when the anti-Stokes pump beam interacts with the QD colloid, it produces a cooling gradient (as long as the QDs can absorb wave-length of this light). This cooling gradient temporarily produces a denser medium, which will make the probe beam deflect toward the normal or pump beam in our case.

Therefore, in accordance with the present invention, only the direction of the probe beam deflection with respect to the pump beam is needed to determine heating or cooling. Note that this analysis does not seek to quantify the cooling or heating with an analytic solution to the heat diffusion equation, but rather only seeks to determine the direction of deflection from the sign of $\Delta T$.

The PDS results obtained according to inventive practice demonstrate that CdSe/ZnS can be cooled at the microscopic level using laser wavelengths between 637 and 660 nm. In addition, the present invention represents a new photothermal deflection methodology. Exemplary inventive practice does not require the use of multiple pump lasers, i.e., a Stokes and anti-Stokes laser, to determine if heating or cooling is occurring inside a medium. Instead, all that is required according to the present invention is the knowledge of how the probe beam interacts with the temperature gradient produced by the pump laser. In other words, if the probe beam is deflected toward the pump beam, cooling is occurring. However, if the probe beam is deflected away from the pump beam, then the laser is heating the sample.

The inventive method is advantageous over current methods. The inventive method does not require multiple lasers to show a phase change and cooling. Exemplary practice of the inventive methodology eliminates the need for multiple pump laser systems; for instance, only one anti-Stokes laser is required to show cooling. This not only simplifies the technology, but also reduces the complexity of the technology by eliminating the need to align multiple pump lasers at the same location. Moreover, since exemplary inventive practice uses a lock-in amplifier, it is capable of much higher sensitivities compared to simply using an oscilloscope. The inventive method as exemplarily practiced only requires knowing which way the probe beam is deflecting with reference to the pump beam. According to exemplary inventive practice: (i) Any material can be used as the photothermal sample, as long as it is uniform; (ii) Any coherent source can be used for the pump beam; (iii) Any stabilized coherent laser source can be used for the probe beam.

The present inventors considered alternative inventive approaches. One approach that the present inventors considered was to use micro thermocouples, or other temperature transducers, to measure the transient or continuous temperature change. However, the present inventors believe that this mode of inventive practice suffers from thermal loading of the system (all junction thermocouples, diodes produce their own heat). Another approach that the present inventors considered was to use an IR camera to image the temperature difference. However, the present inventors believe that this mode of inventive practice suffers from the problem of discriminating milli-Kelvin temperature differences and background noise. In addition, an IR camera system of the required sensitivity and discrimination would be quite expensive.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A method for determining whether heating or cooling of a medium is associated with impingement thereupon by laser energy, the method comprising:
    configuring a probe laser beam, a position sensitive detector, and a sample, said configuring including aligning said probe laser beam with said position sensitive detector so that said probe laser beam passes through said sample and is normal to said position sensitive detector;
    causing said sample to absorb photons of a pump laser beam so as to produce a temperature gradient in said sample, said causing of said sample to absorb said photons including directing said pump laser beam relative to said probe laser beam so that said pump laser beam passes through said sample and is parallel to and completely separated from said probe laser beam in said sample in the absence of said absorption by said sample of said photons, wherein said sample is characterized by a first sample temperature in the absence of said absorption by said sample of said photons, and wherein said sample is characterized by a second sample temperature upon said absorption by said sample of said photons;
    determining a deflection of said probe laser beam with respect to said pump laser beam, wherein said deflection of said probe laser beam with respect to said pump laser beam is indicative of whether said second sample temperature is greater than or less than said first sample temperature, said second sample temperature corresponding to said temperature gradient produced by said absorption by said sample of said photons of said pump laser beam;
    wherein if said deflection of said probe laser beam with respect to said pump laser beam is toward said pump laser beam, then said pump laser beam is producing a said temperature gradient whereby said second sample temperature is less than said first sample temperature, said absorption of said photons by said sample bringing about a decrease in said sample temperature characterizing said sample from said first sample temperature to said second sample temperature, said temperature gradient being a cooling gradient resulting in an increase in the refractive index of said sample, said deflection of said probe laser beam thereby indicating that said pump laser beam is cooling at least a portion of said sample, wherein said cooling of said at least a portion of said sample is anti-Stokes cooling characterized by anti-Stokes emission of photons from said sample;
    wherein if said deflection of said probe laser beam with respect to said pump laser beam is away from said pump laser beam, then said pump laser beam is producing a said temperature gradient whereby said second sample temperature is greater than said first sample temperature, said absorption of said photons by said sample bringing about an increase in said sample temperature characterizing said sample from said first sample temperature to said second sample temperature, said temperature gradient being a heating gradient resulting in a decrease in the refractive index of said sample, said deflection of said probe laser beam thereby indicating that said pump laser beam is heating at least a portion of said sample.

2. The method of claim 1, wherein said determining of said deflection of said probe laser beam with respect to said pump laser beam includes calibrating said probe laser beam with respect to said position sensitive detector.

3. The method of claim 1, wherein if there is no said deflection of said probe laser beam with respect to said pump laser beam, then said second sample temperature equals said first sample temperature.

4. The method of claim 1, wherein said causing of said sample to absorb photons of said pump laser beam is performed so that, in said sample, said probe laser beam and said pump laser beam are counter-propagating with respect to each other.

5. The method of claim 4, wherein if there is no said deflection of said probe laser beam with respect to said pump laser beam, then said second sample temperature equals said first sample temperature.

6. The method of claim 1, wherein said causing of said sample to absorb photons of said pump laser beam includes transmitting said pump laser beam through a right-angle prism.

7. The method of claim 6, wherein if there is no said deflection of said probe laser beam with respect to said pump laser beam, then said second sample temperature equals said first sample temperature.

8. A method for testing temperature effect of electromagnetic propagation through a substance, the method comprising providing an original test material, a position detector, a probe laser for transmitting a probe laser beam, and a pump laser for transmitting a pump laser beam, the method further comprising:
    transmitting said probe laser beam through said original test material to said position detector, said original test material thereby becoming a probe-lasered test material, said probe-lasered test material characterized by a first material temperature, wherein, in the absence of said transmission of said pump laser beam through said test material, said probe laser beam describes a geometric normal with respect to said position detector;

transmitting said pump laser beam through said probe-lasered test material so as to produce a temperature gradient region in said probe-lasered test material, said probe-lasered test material thereby becoming a probe-and-pump lasered test material, said probe-and-pump lasered test material including said temperature gradient region and characterized by a second material temperature, said second material temperature corresponding to said temperature gradient region produced by said pump laser beam, said transmitting of said pump laser beam being performed so that said pump laser beam does not intersect, in said probe-lasered test material, said probe laser beam that describes a geometric normal with respect to said position detector;

observing an angular change, in said temperature gradient region that said probe-and-pump lasered test material includes, of said probe laser beam with respect to said geometric normal wherein:
- a said angular change of said probe laser beam away from said pump laser beam indicates that said pump laser beam is producing a said temperature gradient region whereby said second material temperature is higher than said first material temperature, said pump laser beam thereby heating said probe-lasered test material;
- a said angular change of said probe laser beam toward said pump laser beam indicates that said pump laser beam is producing a said temperature gradient region whereby said second material temperature is lower than said first material temperature, said pump laser beam thereby cooling said probe-lasered test material, wherein said cooling of said probe-lasered test material is anti-Stokes cooling characterized by anti-Stokes emission of photons from said probe-lasered test material.

9. The method for testing temperature effect as recited in claim 8, wherein said pump laser beam is parallel to said probe laser beam that describes a geometric normal with respect to said position detector.

10. The method for testing temperature effect as recited in claim 8, wherein said pump laser beam is counter-propagative with respect to said probe laser beam that describes a geometric normal with respect to said position detector.

11. The method for testing temperature effect as recited in claim 8, wherein zero said angular change of said probe laser beam with respect to said geometric normal indicates that said first material temperature and said second material temperature are equal.

12. The method for testing temperature effect as recited in claim 11, wherein said pump laser beam is parallel to said probe laser beam that describes a geometric normal with respect to said position detector.

13. The method for testing temperature effect as recited in claim 11, wherein said pump laser beam is counter-propagative with respect to said probe laser beam that describes a geometric normal with respect to said position detector.

* * * * *